United States Patent [19]

Nishimura et al.

[11] Patent Number: 4,597,882

[45] Date of Patent: Jul. 1, 1986

[54] PROCESS FOR REGENERATING WASTE OILS OF SYNTHETIC LUBRICANTS CONTAINING FLUORINE ATOM

[75] Inventors: Toshihiro Nishimura, Kawasaki; Muneo Nakayama, Tokyo; Akira Hashimoto, Yokohama, all of Japan

[73] Assignee: Tokyo Denshi Kagaku Co., Ltd., Japan

[21] Appl. No.: 615,736

[22] Filed: May 31, 1984

[30] Foreign Application Priority Data

Jun. 13, 1983 [JP] Japan ............................. 58-104202
Mar. 19, 1984 [JP] Japan ............................. 59-051151

[51] Int. Cl.⁴ ......................................... C10M 107/38
[52] U.S. Cl. .................................. 252/51; 208/180; 208/181; 210/634; 252/54; 568/604; 568/615; 568/621
[58] Field of Search ........................... 208/179–181; 210/634, 704, 799; 570/177, 179, 180, 263; 252/58, 51, 54; 568/604, 609, 615, 621, 637, 610

[56] References Cited

U.S. PATENT DOCUMENTS

| | | | |
|---|---|---|---|
| 3,071,628 | 1/1963 | Linch | 570/180 |
| 3,665,041 | 5/1972 | Sianesi et al. | 252/54 |
| 3,819,508 | 6/1974 | Fainman et al. | 208/180 |
| 4,005,137 | 1/1977 | Rudolph et al. | 570/179 |
| 4,073,720 | 2/1978 | Whisman et al. | 208/181 |
| 4,178,465 | 12/1979 | Caporiccio et al. | 568/604 |
| 4,361,488 | 11/1982 | White et al. | 210/799 |

FOREIGN PATENT DOCUMENTS

| | | | |
|---|---|---|---|
| 52-9205 | 3/1977 | Japan | 210/635 |
| 56-136891 | 10/1981 | Japan | 208/180 |
| 57-11597 | 5/1982 | Japan | . |
| 59-230095 | 12/1984 | Japan | 252/54 |

Primary Examiner—Peter Hruskoci
Attorney, Agent, or Firm—Lowe, Price, Leblanc, Becker & Shur

[57] ABSTRACT

Waste oils of synthetic lubricants containing fluorine atom are admixed with a solvent containing fluorine atom compatible with the waste oils thereby causing contaminants contained in the waste oils to float up into the upper region on the mixed solution. The solvent containing fluorine atom is removed from the solution of the lower layer by way of evaporation, distillation or the like. The regenerated oils of the synthetic lubricants containing fluorine atom thus obtained are completely colorless and transparent in appearance, and they have properties and performances quite similar to those of the fresh oils.

13 Claims, 3 Drawing Figures

PROCESS FOR REGENERATING WASTE OILS OF SYNTHETIC LUBRICANTS CONTAINING FLUORINE ATOM

BACKGROUND OF THE INVENTION

1. Field of the Invention

This invention concerns a process for regenerating waste oils of synthetic lubricants containing fluorine atom and, more specifically, it relates to a process for easily regenerating the waste oils of synthetic lubricants containing fluorine atom to a quality compatable with that of fresh oils.

2. Description of the Prior Art

Synthetic lubricants containing fluorine atom are those synthetic lubricants having the structure represented by the general formula:

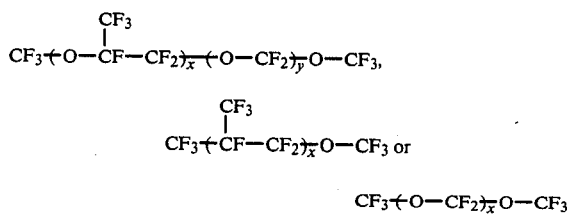

It has been known that such lubricants exhibit excellent oxidation-resistance, chemical-resistance and heat-resistance, as well as being non-toxic in contrast to other lubricants. Further, the synthetic lubricants containing fluorine atom are also greatly different from other lubricants in the physical properties thereof. For instance, they have higher specific gravity compared with other lubricants and are not soluble in water and most organic solvents, as well as being highly stable chemically.

As described above, since the synthetic lubricants containing fluorine atom have such excellent characteristics as not found in other types of lubricants, they are frequently employed owing to their physical properties mainly in applications requiring heat resistance and oxidation resistance or in applications requiring stabilized lubricating performance for a long period of time.

In addition, the synthetic lubricants containing fluorine atom have recently been noted as materials for use in vacuum techniques and are widely employed as the lubricants, particularly, for vacuum pumps to be used in the electronic industry or the like in view of their foregoing properties. It has been recently recognized that the synthetic lubricants containing fluorine atom are quite superior to other types of lubricants with respect to those requirements where the lubricants to be used in the vacuum pumps must exhibit lubricating performance, oxidation resistance, heat resistance, chemical resistance, low vapor pressure, radiation resistance and non-toxicity. Particularly, because of excellent chemical stability, the synthetic lubricants containing fluorine atom are now widely utilized as the lubricants for vacuum pumps in the electronic industry in which dangerous gases which are highly corrosive and contain a lot of dust are often used.

However, even if the synthetic lubricants containing fluorine atom used in vacuum pumps have such a high chemical stability, they have to be finally discarded when they are contaminated and degraded, for instance, by incorporation of various materials discharged from a system to be evacuated, incorporation of abrasive powder of the vacuum pumps and denaturing of the synthetic lubricants containing fluorine atom themselves.

As described above, although the synthetic lubricants containing fluorine atom are chemically inactive and, accordingly, less degradable compared to the lubricants of petroleum origin and have advantageous characteristics as the lubricants for use in the vacuum pumps, contaminants incorporated therein are not dissolved. As a result, the contaminants mixed into the lubricants gradually accumulate. Consequently, in the synthetic lubricants containing fluorine atom, since incorporated contaminants are suspended in the lubricants, fresh lubricants which are initially transparent and viscous gradually become opaque as they are used and finally turn to waste oils with a brownblack appearance and increased viscosity. Generally, the need for replacing the lubricants used in vacuum pumps for the electronic industry, particularly, as used in the dry etching process employed in the production of semiconductor devices, has been judged on the basis of the exhaustion velocity of the vacuum pump. As the exhaustion velocity lowers, it becomes difficult to discharge contaminants produced from etching or the like and it causes unevenness in the etching result. For instance, in an etching step using a gas mixture of $CF_4$ and $O_2$, if it requires more than 13 sec after the starting of the vacuum pump to attain a vacuum of 0.2 Torr, which can initially be obtained within 9-10 sec by fresh oils, unevenness occurs in the etching result. In this state, the lubricants appear brown-black and opaque. If such degraded lubricants are used as they are for a long time continuously, it not only gives an undesirable effect to the etching process but also impairs lubricating performance due to the contaminants mixed in the lubricants upon actuation of the vacuum pump, whereby an undesirable effect is also given to the components of the pump (particularly, bearings and seals of the rotational shaft), to further worsen the function of the vacuum pump. As a result, the time required for attaining an intended vacuum degree is increased or the pressure attainable by the vacuum pump is lowered. Accordingly, lubricants which have turned to such a brown-black color can no longer be used and should be discarded as waste oils.

As is well-known, however, since the synthetic lubricants containing fluorine atom are chemically stable and non-flammable, it is impossible to treat the waste oils through burning or heat decomposition, and the disposal of the waste oils of synthetic lubricants containing fluorine atom provides a significant problem to be solved. Since the synthetic lubricants containing fluorine atom are much more expensive as compared with other synthetic lubricants, development of a process for regenerating the waste oils thereof has keenly be desired, particularly, in the electronic industry where the frequent exchange of lubricants containing fluorine atom is required.

SUMMARY OF THE INVENTION

Accordingly, an object of this invention is to provide a process for regenerating waste oils of synthetic lubricants containing fluorine atom that can produce regenerated oils free from contaminants incorporated in the waste oils of the synthetic lubricants containing fluorine atom.

Another object of this invention is to provide a process for regenerating waste oils of synthetic lubricants containing fluorine atom capable of obtaining regenerated oils rapidly and at a high yield.

The above objects can be attained by the process for regenerating waste oils of synthetic lubricants containing fluorine atom in accordance with this invention, which comprises: a step (A) of adding and stirring a solvent containing fluorine atom with waste oils of synthetic lubricants containing fluorine atom, thereafter, causing contaminants contained in said waste oils to float up and separate into an upper layer on a mixed solution (lower layer) formed from said waste oils and said solvent and then removing said contaminants, and a step (B) of isolating the synthetic lubricants containing fluorine atom from said mixed solution.

BRIEF DESCRIPTION OF THE DRAWINGS

This invention will now be described in more detail by way of preferred embodiments thereof while referring to the accompanying drawings wherein.

Figure 1:
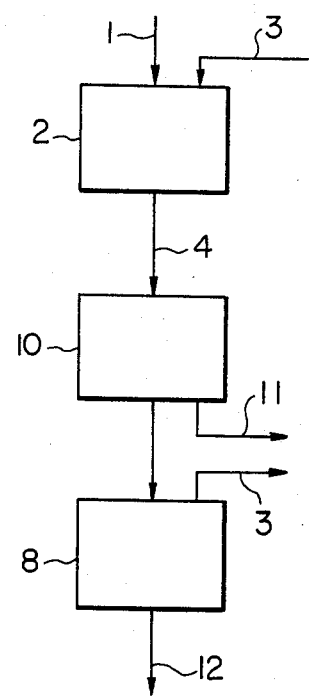
FIG. 1 is a flow chart showing a preferred embodiment of the process according to this invention.

DETAILED DESCRIPTION OF THE INVENTION (Waste Oils of Synthetic Lubricants Containing Fluorine Atom)

Waste oils usable in this invention may include any variety of synthetic lubricants containing fluorine atom. For example, they include waste oils of synthetic lubricants containing fluorine atom which are polymers or oligomers of perfluoropolyether, perfluoropolyphenyl ether or perfluoropolyether triazine employed in the art of the field particularly requiring heat resistance, oxidation stability or the like (for instance in vacuum pumps).

(Solvent Containing Fluorine Atom)

The solvent containing fluorine atom usable in this invention may include any variety of solvents containing fluorine atom that are compatible with synthetic lubricants containing fluorine atom. For example, they include trichloromonofluoromethane, tetrachlorodifluoroethane, trichlorotrifluoroethane, an azeotropic mixture of trichlorotrifluoroethane and methylene chloride, an azeotropic mixture of trichlorotrifluoroethane and ethanol, a mixture of trichlorotrifluoroethane and isopropanol, dibromotetrafluoroethane and the like.

(Regeneration Process)

The step (A) in the process for regenerating the waste oils of synthetic lubricants containing fluorine atom according to this invention comprises mixing and dissolving the waste oils and a solvent containing fluorine atom with each other. It is well known that while synthetic lubricants containing fluorine atom are not soluble in water and most organic solvents containing no fluorine atom, they are soluble in solvents containing fluorine atom at any ratio. Furthermore, solvents containing fluorine atom have a high selective solubilizing property to other compounds, chemical stability, very low surface tension and a great specific gravity. Taking notice of these characteristics, waste oils of synthetic lubricants containing fluorine atom and a solvent containing fluorine atom are mixed with each other to reduce the viscosity of the wasted oils and form a mixed solution of a great specific gravity. In this way, a portion of contaminants incorporated in the waste oils readily float up onto the upper layer of the mixed solution and then separate, while forming a colorless and transparent solution in the lower layer of the mixed solution. The waste oils and the solvent containing fluorine atom may be mixed in such a ratio that at least 0.5 parts by weight of the solvent containing fluorine atom are added based on one part by weight of the waste oils. However, if the solvent containing fluorine atom is used in excess, it takes much time for the subsequent treatment to remove the solvent containing fluorine atom. Accordingly, it is usually desirable to use 0.5-10 parts, preferably, 1-3 parts by weight of the solvent containing fluorine atom based on one part by weight of the waste oils.

In a case where the synthetic lubricants containing fluorine atom are severely contaminated, it is effective to subject the waste oils of a centrifugal or filtering treatment to previously remove the contaminants in the waste oils to some extent prior to the addition of the solvent containing fluorine atom to the waste oils and, thereafter, admix the solvent containing fluorine atom. In the case where the contaminants in the waste oils can be separated into the upper layer while leaving the colorless, transparent and viscous solution in the lower layer within a short time (about 30 min after) by merely admixing the solvent containing fluorine atom to the waste oils and then allowing them to stand, the contaminants may be separated further positively by using a centrifugal separator or the like also in this case.

The step (B) in the process according to this invention comprises collecting the lower layer solution obtained in the step (A) above, and removing the solvent containing fluorine atom included therein to obtain regenerated synthetic lubricants containing fluorine atom. In the step (B), it is desirable to additionally employ a customary step of solid - liquid separation, for instance, a filtering step in a case where solid matter such as powderous metals and the like are present and mixed in the lower layer solution.

There is no particular restriction as to the method of removing the solvent containing fluorine atom from the mixed solution for obtaining a good result, but the solvent containing fluorine atom can be removed with ease by way of ordinary volatilizing or evaporating treatment since the boiling points of most solvents containing fluorine atom are generally low. Vacuum distillation may further be applied after the above-described treatment in order to remove the solvent containing fluorine atom more completely. In this instance, while fluorine atoms may partially be dissociated depending on the condition from the synthetic lubricants containing fluorine atom, such a loss of the fluorine atoms can be compensated by introducing gaseous fluorine into the fluorine-dissociated lubricants, thereby adding the fluorine atoms to the said lubricants containing fluorine atom is performed.

In the process according to this invention, if complete removal of the contaminants is impossible in the step (A), the following step (C) can be inserted between the step (A) and the step (B). That is, the step (C) comprises adding an organic solvent containing no fluorine atom and, if required, water to the lower layer solution obtained in the step (A) and vigorously stirring them to thereby extract the contaminants into the layer of the solvent not containing fluorine. Then, the lower layer solution is collected by settling the solution or applying centrifugal separation. It is also possible to carry out the step (C) and the step (A) simultaneously. That is, a solvent containing fluorine atom, an organic solvent containing no fluorine atom and, if desired, water are admixed in the waste oils and stirred, thereafter, an contaminant containing layer is formed in the upper layer for removal. Whether this procedure is required or not has to be determined depending on the extent of the contamination in the waste oils and it can be judged with ease by carrying out the step (A) and the step (C) simultaneously and judging if the contaminants can be extracted sufficiently.

The solvents containing no fluorine atom may include, for instance, those as described below.

(Solvent Containing no Fluorine Atom)

Water and organic solvents containing no fluorine atom are collectively referred to as the solvent containing no fluorine atom in this specification.

The organic solvent containing no fluorine atom may include any variety of such solvents that can extract contaminants in the waste oils. Specific examples are hydrocarbons such as pentane, hexane, heptane, octane, ligroin, kerosene, naphtha, cyclohexane, toluene and xylene; halogenated hydrocarbons such as methylene chloride, carbon tetrachloride, ethylene chloride, trichloroethane and hexyl chloride; alcohols such as methanol, ethanol, n-propanol, isopropanol, butanol, amyl alcohol, hexanol and heptanol; ethers such as isopropyl ether, butyl ether and furfural; ketones such as acetone, acetyl acetone, cyclohexanone, methyl ethyl ketone, methyl butyl ketone, methyl isobutyl ketone, diethyl ketone, diisobutyl ketone, acetonyl acetone, diacetone alcohol and isophorone; esters such as methyl acetate, ethyl acetate and butyl acetate; polyhydric alcohols such as ethylene glycol monomethyl ether, ethylene glycol monomethyl ether acetate, ethylene glycol monoethyl ether and ethylene glycol monoethyl ether acetate; as well as derivatives thereof.

The ratio of the organic solvent containining no fluorine atom employed herein ranges between 0.2-5 parts, preferably, between 0.5-2 parts by weight based on one part by weight of the solvent containing fluorine atom. In the case of optionally adding water, it is used also in the same ratio ranging from 0.2-5 parts, preferably, between 0.5-2 parts by weight based on one part by weight of the solvent containing fluorine atom.

Removal of the solvent containing fluorine atom, the organic solvent containing no fluorine atom and water from the mixed solution can be carried out with ease in a manner similar to the removal of the solvent containing fluorine atom from the mixed solution as described above by way of ordinary volatilization or distillation. After these treatments, vacuum distillation may further be applied for more complete removal of all of the solvent containing fluorine atom, the organic solvent containing no fluorine atom and water also in this case.

In a case where solid matter such as powderous metals is present and mixed in the waste oils of the synthetic lubricants containing fluorine atom, it is desirable to remove the solid matter by customary means such as filtration at an optional step during the regeneration process. Removal of the solids is preferably carried out with ease in the step where the solvent containing fluorine atom is incorporated since the viscosity of the solution is lower in this state.

Accordingly, it is possible to regenerate synthetic lubricants containing fluorine atom in the process according to this invention by admixing a solvent containing fluorine atom to the waste oils of synthetic lubricants containing fluorine atom, causing a portion of contaminants to float up into the upper layer on the thus obtained mixed solution, further admixing a solvent containing no fluorine atom to the mixed solution after removal of the contaminants to separate the solution into two layers, transferring the remaining portion of the contaminants into the solvent containing no fluorine atom in the upper layer, then separating to collect the lower layer including the solvent containing fluorine atom and the synthetic lubricants containing fluorine atom and, thereafter, evaporating the solvent containing fluorine atom and a slight amount of the remaining solvent containing no fluorine atom from the separated layer thereby obtaining the synthetic lubricants containing fluorine atom as the residue.

The regenerated oils of the synthetic lubricants containing fluorine atom obtained in this way are completely colorless and transparent in appearance and are viscous in nature, having the same properties and performance as those of fresh oils.

Figure 2:
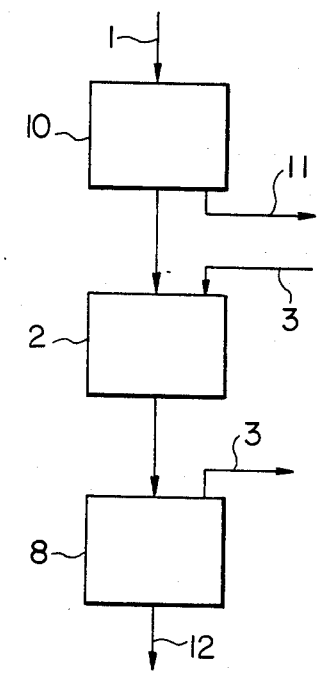
FIG. 2 is a flow chart showing another preferred embodiment of the process according to this invention.
Figure 3:
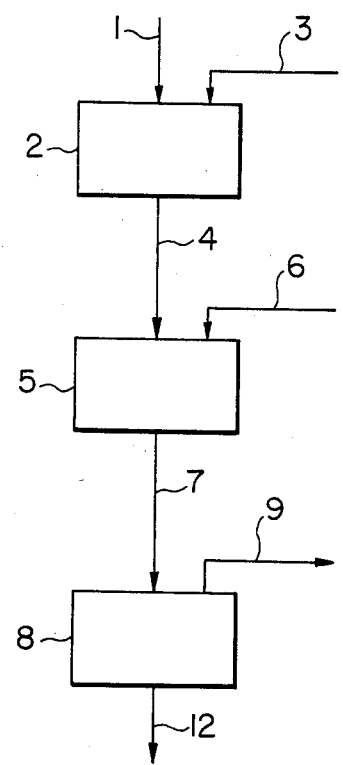
FIG. 3 is a flow chart showing a further preferred embodiment of the process according to this invention.

Explanation will then be made to three examples of the operation practicing the process according to this invention while referring to the appended FIG. 1 through FIG. 3. In FIG. 1, a solvent containing fluorine atom 3 is added to a first mixing tank 2 containing a waste oil 1 of synthetic lubricants containing fluorine atom. After the addition of the solvent containing fluorine atom 3 has been completed, the content in the first mixing tank 2 is well stirred. Then, when the waste oil 1 of the synthetic lubricants containing fluorine atom and the solvent containing fluorine atom 3 are uniformly mixed into a solution, the content in the first mixing tank 2 is allowed to stand, whereby a portion of the contaminants floats up to the upper region on the solution to form two layers in the first mixing tank 2. Then, the upper layer is separated from the lower layer by an adequate means such as decantation. The upper layer is discarded and the lower layer 4 is transferred to a filter 10 and, after filtering out solid matter 11 in the solution, the solution is transferred to an evaporator 8, where the solvent containing fluorine atom 3 is evaporated through heating under reduced pressure to obtain a regenerated oil 12.

In FIG. 2, solid contaminant 11 in the waste oil 1 of the synthetic lubricants containing fluorine atom are removed through a filter 10 and, thereafter, a solvent containing fluorine atom 3 is admixed in a first mixing tank 2 as shown in FIG. 1. Then, the solution of the lower layer in the first mixing tank 2 is introduced to an evaporator 8, where the solvent containing fluorine atom 3 is evaporated through heating under a reduced pressure to obtain a regenerated oil 12.

In FIG. 3, a solvent containing fluorine atom 3 is added to a first mixing tank 2 containing a waste oil 1 of synthetic lubricants containing fluorine atom. After the addition of the solvent containing fluorine atom 3 has been completed, the content in the first mixing tank 2 is stirred well. Then, when the waste oil of the synthetic lubricants containing fluorine atom and the solvent containing fluorine atom 3 are uniformly mixed into a solution, the content in the first mixing tank 2 is allowed to stand. A portion of the contaminants floats up to the upper region on the solution to form two layers in the first mixing tank 2. Then, the upper layer is separated from the lower layer by an adequate means such as decantation, after which the upper layer is discarded and the lower layer 4 is transferred to a second mixing tank 5. Then, a solvent containing no fluorine atom 6 is added to the second mixing tank 5 and the content in the second mixing tank 5 is stirred well. This causes the contaminants remaining in the lower layer 4 formed in the first mixing tank 2 to transfer into the solvent containing no fluorine atom. Thereafter, through standing, the content in the second mixing tank 5, the solvent containing no fluorine atom 6 floats up to form an upper layer. Then, the upper layer is separated from the lower layer by an adequate means such as decantation. Since the contaminants are contained in the upper layer, the layer is discarded or subjected to a purifying treatment for the recovery of the organic solvent containing no fluorine atom 6. The lower layer 7 formed in the second mixing tank 5 is transferred to an evaporator 8. Since the lower layer 7 includes the solvent containing fluorine atom 3 and a slight amount of the solvent containing no fluorine atom 6, these solvents containing fluorine atom and containing no fluorine atom are evaporated by applying an adequate evaporation means such as heating under reduced pressure to the evaporator 8, while leaving regenerated synthetic lubricants containing fluorine atom as the residue in the evaporator 8.

EXAMPLES

This invention will now be explained more specifically referring to examples shown below. Undermentioned examples do not intend to limit the scope of this invention at all.

EXAMPLE 1

Synthetic lubricants containing fluorine atom, "Fomblin" (trade name, manufactured by Montedison Co.) which initially had a performance, in their fresh state, of attaining 0.2 Torr of vacuum within 9 sec. after the starting of a vacuum pump in a dry etching processing apparatus were gradually degraded to such a state where about 13 sec. were required for attaining the same degree of vacuum and unevenness was observed in the etching process. 500 g of such waste oil (brown-black in appearance) used in a vacuum pump were taken in a 2 liter separation funnel, into which were added 1 kg of a solvent containing fluorine atom, "Daiflon Solvent S-3" (trade name, manufactured by Daikin Industries Ltd., trichlorotrifluoroethane) and, after being vigorously stirred to admix for one minute, they were allowed to stand for one hour. Thereafter, contaminants appearing black-brown in the waste oils were separated in the upper layer and a colorless and transparent solution as a mixture of "Fomblin" and "Daiflon Solvent S-3" was separated in the lower layer. Then, the solution of the lower layer collected, filtered through a filter paper and transferred to a one liter beaker. The beaker was placed in a warm bath which was kept at a temperature of 60°–70° C., and "Daiflon Solvent S-3" was completely removed from the mixed solution to obtain regenerated "Fomblin". When the regenerated "Fomblin" was used in the vacuum pump and the time required for attaining 0.2 Torr of vacuum was measured, it was about 9 sec. and no unevenness was found in the etching result.

EXAMPLE 2

Synthetic lubricants containing fluorine atom, "Barrierta J-100" (trade name, manufactured by Nippon Oil Seal Industry Co., Ltd.), which initially had a performance, in their fresh state, of attaining 0.2 Torr of vacuum within 10 sec. after the starting of a vacuum pump in a dry etching processing apparatus were gradually degraded to such a state where about 15 sec. were required for attaining the same degree of vacuum and unevenness was observed in the etching process. 500 g of such waste oil (brown-black in appearance) used in a vacuum pump were taken in a 2 liter separation funnel, into which was added 1 kg of a solvent containing fluorine atom, "Daiflon Solvent S-3" (trade name, manufactured by Daikin Industries Ltd., trichlorotrifluoroethane) and, after being vigorously stirred to admix for one minute, they were allowed to stand for one hour. Thereafter, contaminants appearing black-brown in the waste oil were separated in the upper layer and a colorless and transparent solution as a mixture of "Barrierta J-100" and "Daiflon Solvent S-3" separated in the lower layer. Then, the mixed solution of the lower layer was collected, filtered through a filter paper and transferred to a one liter flask. In the ordinary distillation process, "Daiflon Solvent S-3" was completely removed from the mixed solution to obtain regenerated "Barrierta J-100". When the regenerated "Barrierta J-100" was used and the time required for attaining 0.2 Torr was measured in the same manner as above, it had the same exhaustion velocity as that of the fresh oil and no unevenness was found in the etching result.

EXAMPLE 3

Synthetic lubricants containing fluorine atom, "Fomblin" (trade name, manufactured by Montedison Co), which initially had a performance, in their fresh state, of attaining 0.2 Torr of vacuum within 9 sec. after the starting of a vacuum pump in a dry etching processing apparatus were gradually degraded to such a state where about 13 sec. were required for attaining the same degree of vacuum and unevenness was observed in the etching process. 500 g of such waste oil (brown-black in appearance) used in a vacuum pump were taken in a 2 liter separation funnel, into which was added 1 kg of a solvent containing fluorine atom, "Daiflon Solvent S-3" (trade name, manufactured by Daikin Industries Ltd., trichlorotrifluoroethane), and, after being vigorously stirred to admix for one minute, they were allowed to stand for 10 minutes. Thereafter, contaminants appearing black-brown in the waste oil were separated in the upper layer and a colorless and transparent solution as a mixture of "Fomblin" and "Daiflon Solvent S-3" was separated in the lower layer. Them, the solution of the lower layer was collected, filtered through a filter paper and transferred to a 5 liter beaker. After adding each one liter of water and acetone and vigorously stirring them to mix for 5 minutes, they were allowed to stand for 30 minutes. Then, the solution of the lower layer was collected and transferred to a one liter beaker. The beaker was placed in a warm bath, which was kept at a temperature of 70°–80° C., and "Daiflon Solvent S-3", acetone and water were completely distilled off under reduced pressure to obtain regenerated "Fomblin".

EXAMPLE 4

Synthetic lubricants containing fluorine atom, "Barrierta J-100" (trade name, manufactured by Nippon Oil Seal Industry Co., Ltd.), which initially had a performance, in their fresh state, of attaining 0.2 Torr of vacuum within 10 sec. after the starting of a vacuum pump in a dry etching processing apparatus were gradually degraded to such a state where about 15 sec. were required for attaining the same degree of vacuum and unevenness was observed in the etching process. 500 g of such waste oils (brown-black in appearance) used in a vacuum pump were taken in a 2 liter separation funnel, into which were added 1.5 kg of a solvent containing fluorine atom, "Magic Dry E-6" (trade name, manufactured by Daikin Industries Ltd.), and, after being vigorously stirred to admix for one minute, they were allowed to stand for 10 minutes. Thereafter, contaminants appearing black-brown in the waste oil were separated in the upper layer and a colorless and transparent solution as a mixture of "Barrierta J-100" and "Magic Dry E-6" was separated in the lower layer. Then, the solution of the lower layer was collected and transferred to a 5 liter beaker. After adding each 1.5 liter of water and methanol and vigorously stirring them to mix for 5 minutes, they were allowed to stand for 10 minutes. Then, the lower layer was collected and transferred to a 2 liter flask. In the ordinary distillation process, remaining "Magic Dry E-6", methanol and water were completely removed and filtered through filter paper to obtain regenerated "Barrierta J-100". When the regenerated "Berrierta J-100" was used and the time required for attaining 0.2 Torr was measured in the same manner, it had the same exhaustion velocity as that of fresh oil and no unevenness was observed in the etching process.

EFFECT OF THE INVENTION

According to the process for regenerating waste oils of synthetic lubricants containing fluorine atom of this invention, regenerated oils can be obtained by a simple procedure, rapidly and at a high yield and their properties and performance are quite similar to those of fresh oils. Accordingly, synthetic lubricants containing fluorine atom which are very expensive but of a high practical value can be used repeatedly for a long period of time.

What is claimed is:

1. A process for regenerating waste oils of fluorine atom containing synthetic lubricants comprising a polymer or an oligomer selected from the group consisting of perfluoropolyether, perfluoropolyphenylether and perfluoropolyether triazine, comprising:
   (a) adding to said waste oils a fluorine containing solvent selected from the group consisting of trichloromonofluoromethane, tetrachlorodifluoroethane, trichlorotrifluoroethane, an azeotropic mixture of trichlorotrifluoroethane and methylene chloride, an azeotropic mixture of trichlorotrifluoroethane and ethanol, a mixture of trichlorotrifluoroethane and isopropanol, and dibromotetrafluoroethane, in sufficient amounts that at least 0.5 parts by weight of said fluoring containing solvent are added per one part by weight of said waste oils;
   (b) mixing the solvent and waste oils to form a mixed solution to cause contaminants contained in said waste oils to float upwards and separate into an upper layer on the mixed solution formed from said waste oils and said solvent;
   (c) removing said upper layer to separate said contaminants;
   (d) adding a non-fluorine containing solvent to the mixed solution and separating the resultant mixture into two layers to transfer any remaining portion of the contaminants to the non-fluorine containing solvent in the upper layer, said non-fluorine containing solvent being selected from the group consisting of pentane, hexane, heptane, octane, ligroin, kerosene, naphtha, cyclohexane, toluene, xylene, methylene chloride, carbon tetrachloride, ethylene chloride, trichloroethane, hexyl chloride, methanol, ethanol, n-propanol, isopropanol, butanol, amyl alcohol, hexanol, heptanol, isopropyl ether, butyl ether, furfural, acetone, acetyle acetone, cyclohexanone, methyl ethyl ketone, methyl butyl ketone, methyl isobutyl ketone, diethyl ketone, diisobutyl ketone, acetonyl acetone, diacetone alcohol, isophorone, methyl acetate, ethyl acetate, butyl acetate, ethylene glycol monomethyl ether, ethylene glycol monomethyl ether acetate, ethylene glycol monoethyl ether, and ethylene glycol monoethyl ether acetate, and being added in an amount of at least 0.2 parts by weight per one part by weight of the fluorine containing solvent; and
   (e) recovering the fluorine containing synthetic lubricants from said mixed solution forming the lower layer.

2. The process as defined in claim 1 wherein 0.5-10 parts by weight of fluorine containing solvent are added per one part by weight of the waste oils of the fluorine atom containing synthetic lubricants.

3. The process as defined in claim 1, wherein two or more types of non-fluorine containing solvents are added to said waste oils.

4. The process as defined in claim 3, wherein one of said non-fluorine containing solvents is water.

5. The process as defined in claim 4 wherein 0.2-5 parts by weight of water are added per one part by weight of the fluorine containing solvent.

6. The process as defined in claim 4 wherein 0.5-2 parts by weight of water are added per one part by weight of the fluorine containing solvent.

7. The process as defined in claim 1, wherein solid contaminants incorporated in the waste oils are removed by centrifugal separation prior to addition of the solvent in step (a) or subsequent to step (e).

8. The process as defined in claim 1, wherein the mixture is filtered prior to step (a), between the steps (b) and (c), or after step (e), thereby removing solid contaminants incorporated in the waste oils.

9. The process as defined in claim 1 wherein the fluorine containing solvent is trichlorotrifluoroethane.

10. The process as defined in claim 1 wherein 2-3 parts by weight of the fluorine containing solvent are added per one part by weight of the fluorine atom containing synthetic lubricants waste oils.

11. The process as defined in claim 1 wherein the non-fluorine containing organic solvent is selected from the group consisting of acetone and methanol.

12. The process as defined in claim 1 wherein 0.2-5 parts by weight of the non-fluorine containing organic solvent are added per one part by weight of the fluorine containing solvent.

13. The process as defined in claim 1 wherein 0.5-2 parts by weight of the non-fluorine containing organic solvent is added per one part by weight of the fluorine-containing solvent.

* * * * *